United States Patent
Shamis et al.

(10) Patent No.: US 8,007,404 B2
(45) Date of Patent: Aug. 30, 2011

(54) TRANSMISSION SHIFT SIGNAL FOR AFTERTREATMENT DEVICE CONTROL

(75) Inventors: Dmitry Arie Shamis, Commerce Township, MI (US); Matthew Richard Busdiecker, Royal Oak, MI (US); Johannes Walter Reuter, Allensbach (DE)

(73) Assignee: Eaton Corporation, Cleveland, OH (US)

( * ) Notice: Subject to any disclaimer, the term of this patent is extended or adjusted under 35 U.S.C. 154(b) by 929 days.

(21) Appl. No.: 12/001,690

(22) Filed: Dec. 12, 2007

(65) Prior Publication Data

US 2009/0156358 A1 Jun. 18, 2009

(51) Int. Cl.
*F16H 59/74* (2006.01)
(52) U.S. Cl. .......................................... 477/100
(58) Field of Classification Search .................... 477/100
See application file for complete search history.

(56) References Cited

U.S. PATENT DOCUMENTS

| | | | |
|---|---|---|---|
| 6,109,024 A | 8/2000 | Kinugasa et al. | |
| 6,370,868 B1 | 4/2002 | Kolmanovsky et al. | |
| 6,866,610 B2 | 3/2005 | Ito | |
| 6,910,329 B2 | 6/2005 | Bunting et al. | |
| 7,063,642 B1 * | 6/2006 | Hu et al. | 477/100 |
| 2003/0101713 A1 | 6/2003 | Dalla Betta et al. | |
| 2006/0277898 A1 | 12/2006 | McCarthy et al. | |
| 2007/0079603 A1 | 4/2007 | Hu et al. | |
| 2007/0082783 A1* | 4/2007 | Hu et al. | 477/100 |
| 2008/0006025 A1 | 1/2008 | McCarthy, Jr. | |

FOREIGN PATENT DOCUMENTS

JP 10338059 A1 12/1998
* cited by examiner

*Primary Examiner* — Edwin Young
(74) *Attorney, Agent, or Firm* — Paul V. Keller

(57) ABSTRACT

Discontinuous torque ratio shifts by a transmission can result in complex transient exhaust conditions that can adversely affect exhaust air-fuel ratio control, which can result in ineffective regeneration. In extreme cases, the result can be irreversible damage to exhaust system components. The inventors' concept is to alter either regeneration scheduling or shift scheduling to avoid shifting while regenerating.

20 Claims, 1 Drawing Sheet

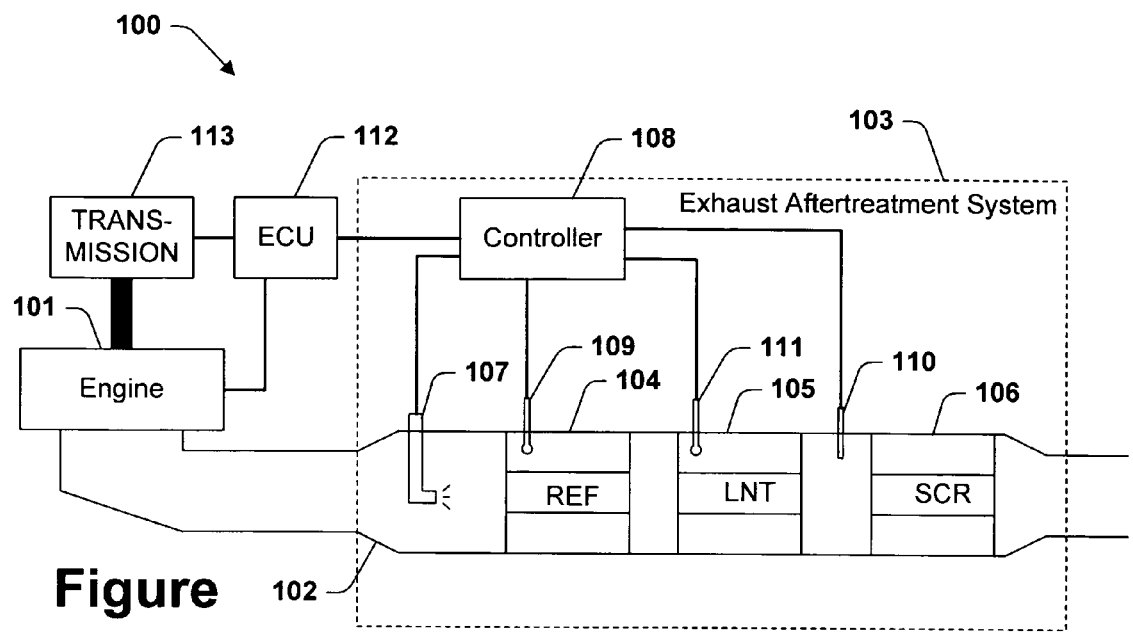
Figure

TRANSMISSION SHIFT SIGNAL FOR AFTERTREATMENT DEVICE CONTROL

FIELD OF THE INVENTION

The present invention relates to diesel power generation systems with exhaust aftertreatment.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_X$ emissions. In diesel-powered vehicles, which use compression ignition, the exhaust is generally too oxygen-rich for three-way catalysts to be effective.

Several solutions have been proposed for controlling $NO_X$ emissions from diesel-powered vehicles. One set of approaches focuses on the engine. Techniques such as exhaust gas recirculation and partially homogenizing fuel-air mixtures are helpful, but these techniques alone will not eliminate $NO_X$ emissions. Another set of approaches remove $NO_X$ from the vehicle exhaust. These include the use of lean-burn $NO_X$ catalysts, selective catalytic reduction (SCR) catalysts, and lean $NO_X$ traps (LNTs).

Lean-burn $NO_X$ catalysts promote the reduction of $NO_X$ under oxygen-rich conditions. Reduction of $NO_X$ in an oxidizing atmosphere is difficult. It has proven challenging to find a lean-burn $NO_X$ catalyst that has the required activity, durability, and operating temperature range. A reductant such as diesel fuel must be steadily supplied to the exhaust for lean $NO_X$ reduction, introducing a fuel economy penalty of 3% or more. Currently, peak $NO_X$ conversion efficiencies for lean-burn $NO_X$ catalysts are unacceptably low.

SCR generally refers to selective catalytic reduction of $NO_X$ by ammonia. The reaction takes place even in an oxidizing environment. The $NO_X$ can be temporarily stored in an adsorbent or ammonia can be fed continuously into the exhaust. SCR can achieve high levels of $NO_X$ reduction, but there is a disadvantage in the lack of infrastructure for distributing ammonia or a suitable precursor. Another concern relates to the possible release of ammonia into the environment.

LNTs are devices that adsorb $NO_X$ under lean conditions and reduce and release the adsorbed $NO_X$ under rich conditions. An LNT generally includes a $NO_X$ adsorbent and a catalyst. The adsorbent is typically an alkali or alkaline earth compound, such as $BaCO_3$ and the catalyst is typically a combination of precious metals including Pt and Rh. In lean exhaust, the catalyst speeds oxidizing reactions that lead to $NO_X$ adsorption. In a reducing environment, the catalyst activates reactions by which hydrocarbon reductants are converted to more active species, the water-gas shift reaction, which produces more active hydrogen from less active CO, and reactions by which adsorbed $NO_X$ is reduced and desorbed. In a typical operating protocol, a reducing environment will be created within the exhaust from time-to-time to regenerate (denitrate) the LNT.

Regeneration to remove accumulated $NO_X$ may be referred to as denitration in order to distinguish desulfation, which is carried out much less frequently. The reducing environment for denitration can be created in several ways. One approach uses the engine to create a rich exhaust-reductant mixture. For example, the engine can inject extra fuel into the exhaust within one or more cylinders prior to expelling the exhaust. A reducing environment can also be created by injecting a reductant into lean exhaust downstream from the engine. In either case, a portion of the reductant is generally expended to consume excess oxygen in the exhaust. To lessen the amount of excess oxygen and reduce the amount of reductant expended consuming excess oxygen, the engine may be throttled, although such throttling may have an adverse effect on the performance of some engines.

Reductant can consume excess oxygen by either combustion or reforming reactions. Typically, the reactions take place upstream of the LNT over an oxidation catalyst or in a fuel reformer. The reductant can also be oxidized directly in the LNT, but this tends to result in faster thermal aging. U.S. Pat. Pub. No. 2003/0101713 describes an exhaust system with a fuel reformer placed in an exhaust line upstream from an LNT. The reformer includes both oxidation and reforming catalysts. The reformer both removes excess oxygen and converts the diesel fuel reductant into more reactive reformate.

Regardless of how the reducing environment is created, regeneration scheduling is an important consideration. If the frequency of regeneration is too low, the LNT will fail to perform its function effectively. If the frequency of regeneration is too high, the fuel penalty becomes excessive. The fuel penalty for regenerating an LNT is a significant factor contributing to the operating cost of a vehicle using an LNT and it is desirable to keep that fuel penalty as low as possible while still meeting emission control objectives.

In spite of advances, there continues to be a long felt need for an affordable and reliable diesel exhaust aftertreatment system that is durable, has a manageable operating cost (including fuel penalty), and reduces $NO_X$ emissions to a satisfactory extent in the sense of meeting U.S. Environmental Protection Agency (EPA) regulations effective in 2010 and other such regulations that will limit $NO_x$ emissions from trucks and other diesel-powered vehicles. Manufacturers and researchers have put considerable effort toward meeting those regulations.

SUMMARY

The inventors have observed that transmission gear shifts result in complex transient exhaust conditions that can adversely affect exhaust air-fuel ratio control. Potential consequences include ineffective regeneration processes. In extreme cases, the consequences can include irreversible damage to exhaust system components during attempts to regenerate. The inventors' concept is to alter either regeneration scheduling or shift scheduling to avoid shifting while regenerating.

One aspect of the invention relates to a method of operating a power generation system comprising a diesel engine and a transmission. The method comprises passing the engine exhaust through an exhaust aftertreatment system comprising a lean $NO_X$ trap, timing denitration of the lean $NO_X$ trap based on a criteria relating to the state and/or the performance of the exhaust aftertreatment system, or a portion thereof comprising the lean $NO_X$ trap, and varying the denitration timing to avoid denitrating while the transmission is discontinuously shifting.

Another aspect of the invention also relates to a method of operating a power generation system comprising a diesel engine and a transmission capable of discontinuous torque ratio shifts. The method comprises passing the engine exhaust through an exhaust aftertreatment system comprising a lean $NO_X$ trap, timing denitration of the lean $NO_X$ trap based on a criteria relating to the state and/or the performance of the exhaust aftertreatment system, or a portion thereof comprising the lean $NO_X$ trap, and varying the timing of the discontinuous shifts to avoid discontinuously shifting while denitrating the lean $NO_X$ trap.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

BRIEF DESCRIPTION OF THE DRAWINGS

The FIGURE is a schematic illustration of an exemplary power generation system in which various concepts of the inventor can be implemented.

DETAILED DESCRIPTION

The FIGURE is a schematic illustration of a power generation system 100 to which various of the inventors' concepts are applicable. The power generation system 100 is not the only power generation system to which the inventors' concepts are applicable, but the various concepts described herein were originally developed for systems like the system 100 and components of the system 100 pertain to preferred embodiments. The power generation system 100 comprises a diesel engine 101, a transmission 113, an engine control unit (ECU) 112, and an exhaust line 102 in which are configured components of an exhaust aftertreatment system 103. The ECU 112 controls the engine 101 and the transmission 113. Optionally, the transmission 113 can be controlled by a separate unit from the ECU 112.

The exhaust aftertreatment system 103 comprises a fuel reformer 104, a lean $NO_X$ trap 105, and an ammonia-SCR catalyst 106. A fuel injector 107 is configured to inject fuel into the exhaust line 102 upstream from the fuel reformer 104. A controller 108 controls the fuel injection based on information about the engine 101, a temperature of the fuel reformer 104 measured by a temperature sensor 109, and a $NO_X$ concentration measurement obtained by the $NO_X$ sensor 110 at a point in the exhaust line 102 downstream from the lean $NO_X$ trap 105. A temperature sensor 111 is configured to measure the temperature of the lean $NO_X$ trap (LNT) 105, which is particularly important during desulfation. The ECU 112 and the controller 108 can be combined into a single unit.

The diesel engine 101 is a compression ignition engine. A compression ignition diesel engine normally produces exhaust having from about 4 to about 21% $O_2$. An overall rich exhaust-reductant mixture can be formed by injecting diesel fuel into the exhaust during cylinder exhaust strokes, although it is preferred that any reductant be injected into the exhaust downstream from the engine 101. The engine 101 is commonly provided with an exhaust gas recirculation (EGR) system and may also be configured with an intake air throttle, either of which can be used to reduce the exhaust oxygen concentration and lessen the amount of reductant required to produce an overall rich exhaust-reductant mixture. A lean burn gasoline engine or a homogeneous charge compression ignition engine can be used in place of the engine 101. The engine 101 is operative to produce an exhaust that comprises $NO_X$, which is considered to consist of NO and $NO_2$.

The exhaust from the engine 101 is channeled by a manifold to the exhaust line 102. The exhaust line 102 generally comprises a single channel, but can be configured as several parallel channels. The exhaust line 102 is preferably configured without exhaust valves or dampers. In particular, the exhaust line 102 is preferably configured without valves or dampers that could be used to vary the flow of exhaust to the LNT 105. The inventors' concepts are applicable to aftertreatment systems with exhaust valves or dampers, but the present invention provides a greater benefit in systems without valves or dampers that could be used to protect the LNT 105 from unfavorable exhaust conditions created by shifts. In any event, it is preferred that the exhaust line 102 be configured without valves or dampers because these moving parts are subject to failure and can significantly decrease the durability and reliability of an exhaust aftertreatment system.

Even when the exhaust line 102 is free from exhaust valves or dampers, an exhaust line upstream from the exhaust line 102 may still contain an exhaust valve, such as an exhaust gas recirculation (EGR) valve in an EGR line. Exhaust valves are particularly problematic when they are configured within a main exhaust line to divert a majority of the exhaust flow as compared to exhaust valves configured to control the flow through a side branch off a main exhaust line. Exhaust valves for larger conduits are more subject to failure than exhaust valves for smaller conduits.

The exhaust line 102 is provided with an exhaust line fuel injector 107 to create rich conditions for regenerating the LNT 105. The inventors' concepts are applicable to other method's of creating a reducing environment for regenerating the LNT 105, including engine fuel injection of reductant and injection of reductants other than diesel fuel. Nevertheless, it is preferred that the reductant is the same diesel fuel used to power the engine 101. It is also preferred that the reductant be injected into the exhaust line 102, rather than into the cylinders of engine 101, in order to avoid oil dilution caused by fuel passing around piston rings and entering the oil gallery. Additional disadvantages of cylinder reductant injection include having to alter the operation of the engine 101 to support LNT regeneration, excessive dispersion of pulses of reductant, forming deposits on any turbocharger configured between the engine 101 and the exhaust line 102, and forming deposits on any EGR valves.

In the example, diesel fuel is injected into the exhaust line 102 upstream from a fuel reformer 104. The fuel reformer 104 comprises an effective amount of precious metal catalyst to catalyze oxidation and steam reforming reactions at 600° C. Palladium and rhodium are preferred oxidation and reforming catalysts for this system. The fuel reformer 104 is designed with low thermal mass, whereby it can be easily heated to steam reforming temperatures for each LNT regeneration. Low thermal mass is typically achieved by constructing the fuel reformer 104 around a thin metal substrate. A thin metal substrate has a thickness that is about 100 µm or less, preferably about 50 µm or less, and still more preferably about 30 µm or less.

Steam reforming temperatures are at least about 500° C., which is generally above diesel exhaust temperatures. Diesel exhaust temperatures downstream from a turbocharger vary from about 110 to about 550° C. Preferably, the fuel reformer 104 can be warmed up and operated using diesel fuel from the injector 107 stating from an initial temperature of 275° C. while the exhaust from the engine 101 remains at 275° C. More preferably, the fuel reformer 104 can be warmed up and operated from initial exhaust and reformer temperatures of 225° C., and still more preferably from exhaust and reformer temperatures of 195° C. These properties are achieved by providing the fuel reformer 104 with effective amounts of precious metals, such as Pt and/or Pd, for catalyzing oxidation of diesel fuel at the starting temperatures. Low temperature start-up can also be improved by configuring a low thermal mass precious metal oxidation catalyst upstream from the fuel reformer 104. Preferably, the upstream catalyst combusts a portion of the fuel while vaporizing the rest. A mixing zone between the upstream catalyst and the fuel reformer 104 is also helpful.

Having the fuel reformer 104 operate at steam reforming temperatures reduces the total amount of precious metal catalyst required. Less precious metal catalyst is required when reforming at steam reforming temperatures as compared to reforming diesel fuel at exhaust temperatures regardless of whether reforming is through partial oxidation and stream reforming or exclusively though partial oxidation reactions.

Having the fuel reformer 104 operate at least partially through steam reforming reactions significantly increases the reformate yield and reduces the amount of heat generation. In principal, if reformate production proceeds through partial oxidation reforming as in the reaction:

$$CH_{1.85} + 0.5O_2 \rightarrow CO + 0.925H_2 \quad (1)$$

1.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

$$CH_{1.85} + H_2O \rightarrow CO + 1.925H_2 \quad (2)$$

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust.

Preferably, the fuel reformer 104 comprises enough steam reforming catalyst that at 600° C., with an 8 mol % exhaust oxygen concentration from the engine 101 and with sufficient diesel fuel to provide the exhaust with an overall fuel to air ratio of 1.2:1, at least about 2 mol % reformate is generated by steam reforming, more preferably at least about 4 mol %, and still more preferably at least about 6 mol %. For purposes of this disclosure, functional descriptions involving diesel fuel are tested on the basis of the No. 2 diesel fuel oil sold in the United States, which is a typical diesel fuel.

The inventors' concepts are applicable to power generation systems that do not process injected diesel fuel through fuel reformers comprising steam reforming catalysts. For example, the injected diesel fuel can be combusted to consume excess oxygen in the LNT 105, or in an upstream oxidation catalyst. The injected diesel fuel can also be processed to form reformate by partial oxidation reactions below steam reforming temperatures.

An LNT is a device that adsorbs $NO_X$ under lean conditions and reduces and releases $NO_X$ under rich conditions. An LNT generally comprises a $NO_X$ adsorbent and a precious metal catalyst in intimate contact on an inert support. Examples of $NO_X$ adsorbent materials include certain oxides, carbonates, and hydroxides of alkaline earth metals such as Mg, Ca, Sr, and Ba or alkali metals such as K or Cs. The precious metal typically consists of one or more of Pt, Pd, and Rh. The support is typically a monolith, although other support structures can be used. The monolith support is typically ceramic, although other materials such as metal and SiC are also suitable for LNT supports. The LNT 105 may be provided as two or more separate bricks.

The ammonia-SCR catalyst 106 is functional to catalyze reactions between $NO_X$ and $NH_3$ to reduce $NO_X$ to $N_2$ in lean exhaust. The ammonia-SCR catalyst 106 adsorbs $NH_3$ released from the LNT 105 during denitration and subsequently uses that $NH_3$ to reduce $NO_X$ slipping from the LNT 105 under lean conditions. Examples of ammonia-SCR catalysts include certain oxides of metals such as Cu, Zn, V, Cr, Al, Ti, Mn, Co, Fe, Ni, Mo, W, and Ce and zeolites, such as ZSM-5 or ZSM-11, substituted with metal ions such as cations of Cu, Co, Ag, or Zn. Ammonia-SCR can be accomplished using precious metals, but preferably the SCR catalyst 106 is substantially free of precious metals. Preferably, the ammonia-SCR catalyst 106 is designed to tolerate temperatures required to desulfate the LNT 105.

The exhaust aftertreatment system 100 can comprise other components, such a diesel particulate filter and a clean-up oxidation catalyst. A thermal mass can be placed between the fuel reformer 104 and the LNT 105 to protect the LNT 105 from frequent exposure to high fuel reformer temperatures. A diesel particulate filter can be used as the thermal mass.

During normal operation (a lean phase), the engine 101 is operated to produce an exhaust comprising $NO_X$, particulate matter, and excess oxygen. A portion of the $NO_X$ is adsorbed by the LNT 105. The ammonia-SCR catalyst 106 may have ammonia stored from a previous denitration of the LNT 105. If the ammonia-SCR catalyst 106 contains stored ammonia, an additional portion of the $NO_X$ is reduced over the ammonia-SCR catalyst 106 by reaction with stored ammonia. The fuel injector 107 is generally inactive over this period, although small fuel injections might be used to maintain the fuel reformer 104 at a temperature from which it can be easily heated or to maintain the lean $NO_X$ trap 105 at a temperature at which it effectively absorbs $NO_X$.

From time-to-time, the LNT 105 must be regenerated to remove accumulated $NO_X$ (denitrated) in a rich phase. Denitration generally involves heating the reformer 104 to an operational temperature and then using the reformer 104 to produce reformate. The reformer 104 is generally heated by injecting fuel into the exhaust upstream from the fuel reformer 104 at a sub-stoichiometric rate, whereby the exhaust-reductant mixture remains overall lean and most of the injected fuel completely combusts in the reformer 104. This may be referred to as a lean warm-up phase. Once combustion has heated the reformer 104, the fuel injection rate can be increased and/or the exhaust oxygen flow rate reduced to make the exhaust-reductant mixture overall rich, whereupon the reformer 104 consumes most of the oxygen from the exhaust and produces reformate by partial oxidation and/or steam reforming reactions. The reformate thus produced reduces $NO_X$ absorbed in the LNT 105. Some of the $NO_X$ may be reduced to $NH_3$, which is absorbed and stored by the ammonia-SCR catalyst 106.

The controller 108 schedules denitration of the LNT 105 based on criteria relating to the state and or performance of the exhaust aftertreatment system 103 or a component thereof comprising the LNT 105. The schedule or the criteria defining the schedule may be altered to avoid denitrating during certain shifts. The controller 108 may be the same as the ECU 112 or may be a separate device.

Criteria for scheduling LNT denitration may be based on LNT loading. LNT loading can be characterized in terms of amount of $NO_X$ accumulated, remaining $NO_X$ storage capacity, percent saturation, or another parameter of this type.

Numerous methods for estimating $NO_X$ loading and/or remaining $NO_X$ storage capacity have been proposed. These methods generally involve integrating an estimate of the $NO_X$ storage rate and comparing the result to an estimated $NO_X$ storage capacity.

$NO_X$ storage rates can be estimated from differences between $NO_X$ flow rates out of the engine 101 and $NO_X$ flow rates out of the LNT 105 or by multiplying $NO_X$ flow rates out of the engine 101 by estimates of the $NO_X$ trapping efficiency of the LNT 105. Engine out $NO_X$ flow rates can be estimated exclusively from engine operating maps or using a $NO_X$ sensor in the exhaust upstream from the LNT 105. $NO_X$ flow rates out of the LNT 105, when used, are generally estimated using $NO_X$ concentration sensors, such as the sensor 110.

Other criteria that can be used to schedule denitration include criteria that relate to current performance of the aftertreatment system 103, or a portion thereof comprising the LNT 105, as determined from $NO_X$ concentration measurements taken downstream from the LNT 105. These measurements can be used on a standalone basis, regenerating when the downstream concentration exceeds a critical value, or in combination of with estimates of NOx concentration upstream from the LNT 105, whereby the LNT performance efficiency can be determined and used as a criteria. The performance of the LNT 105 can be determined individually, or the performance of the LNT 105 in combination with another device, such as an SCR reactor 106, can be measured.

From time to time, the LNT 105 must also be regenerated to remove accumulated sulfur compounds (desulfated). Desulfation involves heating the fuel reformer 104 to an operational temperature, heating the LNT 105 to a desulfating temperature, and providing the heated LNT 105 with a rich atmosphere. Desulfating temperatures vary, but are typically in the range from about 500 to about 800° C., with optimal temperatures typically in the range of about 650 to about 750° C. Below a minimum temperature, desulfation is very slow. Above a maximum temperature, the LNT 105 may be damaged.

The LNT 105 can be warmed by heat convection from the reformer 104. To generate this heat, fuel can be supplied to the reformer 104 under lean conditions, whereby the fuel combusts in the reformer 104. Once the reformer 104 is heated, the fuel injection rate can be controlled to maintain the temperature of the reformer 104 while the LNT 105 are heating. LNT heating can be augmented by pulsing fuel injection, which causes combustion in the LNT 105. After the LNT 105 has heated sufficiently, the fuel injection rate can be increased to provide a lean atmosphere.

The transmission 113 operates simultaneously with the engine 101 and the exhaust aftertreatment system 102. The transmission 113 varies the torque ratio between the engine 101 and a device, typically a drive train, propelled by the power generation system 100. The torque ratio is varied to meet drive requirements while keeping the engine speed within a desired range.

The transmission 113 can be of any suitable type. The transmission 113 can be a conventional transmission such as a counter-shaft type mechanical transmission, but can also be a continuously variable transmission (CVT) in which part of the torque is transmitted through a stepped transmission. Generally, the transmission 113 will be an automatic transmission, but some aspects of the invention are applicable to manual transmissions as well. The transmission 113 operates in part through discontinuous shifts, which are defined in contrast to continuous shifts. A discontinuous shift involves a torque break as the torque ratio is changed from one value to another.

Attempting to denitrate the lean $NO_X$ trap 105 while the transmission 113 makes a discontinuous shift can be problematic. The exhaust composition, temperature, and flow rate undergo transients corresponding to a combination of the exhausts generated before the torque break, during the torque break, and after the torque break. The response times of different exhaust characteristics differ significantly. For example, flow rates changes propagate through the exhaust system quickly while composition changes propagate more slowly. The mixtures of characteristics from different exhausts result in complex variations. In view of these variations, it can be difficult to determine the composition of the exhaust at particular points in the exhaust line 102 at particular times. Consequently, it is difficult to control the exhaust air-fuel ratio, it is difficult to control the temperature of the fuel reformer 104, and it is difficult to know how much reductant the lean $NO_X$ trap 105 is receiving and how rapidly it is regenerating. Possible consequences include ineffective regeneration of the lean $NO_X$ trap 105, excessive fuel consumption, and damage to exhaust system components.

In the exemplary system 100, the air-fuel ratio is controlled by injecting fuel into the exhaust line 102 through the fuel injector 107. If too much fuel is injected in comparison to the exhaust flow rate, the result can be excessive break-through of unconverted fuel from the fuel reformer 104. This unconverted fuel can cause a high degree of release of unreduced NOx from the lean $NO_X$ trap 105. Unconverted fuel can also poison the SCR catalyst 106. Unconverted fuel can also react downstream from the fuel reformer 104 and cause undesirable heating at various points in the exhaust line 102.

Injecting too little fuel during the rich phase is also problematic. As the fuel injection rate is reduced from the target amount toward a stoichiometric amount, the rate of endothermic steam reforming in the fuel reformer 104 decreases while the rate of exothermic combustion remains essentially constant, causing the fuel reformer 104 to heat at an increased rate. This heating can be so excessive that the fuel reformer 104 is damaged. While it may be possible to interrupt the regeneration and stop the fuel injection before the fuel reformer 104 overheats, this course prolongs the denitration process and increases fuel consumption.

Another potential problem with regenerating during discontinuous shifts is that unusually high exhaust oxygen flow rates may occur. High oxygen flow rates can result in excessive fuel consumption to maintain rich conditions and also excessive heat generation in the fuel reformer 104. Again, the result can be damage to exhaust system components or the necessity of shutting down the fuel injection, interrupting the denitration to allow time for the fuel reformer 104 to cool.

One of the inventors' concepts is to selectively advance or postpone the timing of denitration to avoid regenerating during discontinuous transmission torque ratio shifts. The selectivity can be based on the denitration criteria, for example, advancing the denitration timing only if the criteria for initiating denitration is near being satisfied when the shift is approaching. The selection can also consider a characteristic of the shift event, where the timing is only altered if the shift is within a limited category of shift types.

Some types of shifts can be advantageous for denitration and it may be desirable to preserve the denitration timing, or even alter it to coincide with the shift, when the shift is of such a type. For example, an upshift during vehicle acceleration may result in a combination of low exhaust flow rate and low exhaust oxygen concentration that enable denitration with a low fuel penalty. Whether to take advantage of such events is a matter of design choice. Nothing in this disclosure is inconsistent with differentiating among different types of discontinuous shifts and selecting to avoid denitration during some types of discontinuous shifts but not others. On the other hand, the term "selectively avoiding" should not be interpreted to exclude the case where avoidance is carried out without exception; the selection can be to always avoid.

In one embodiment, denitration is selectively postponed when a discontinuous shift is in progress, a shift is imminent, or the probability that a shift will occur in the immediate future exceeds a predetermined threshold. A shift is imminent if it is on the verge of taking place, or will take place within a short period, such as within a few seconds. Postponing may involve prohibiting denitration for a fixed period or prohibiting denitration until the shift is complete or until some time after the shift is complete. Denitration may be postponed at least until a signal is received indicating the shift has been made. It may be desirable to allow a period to pass following the completion of the shift before allowing denitration; it may take up to a few seconds following denitration for exhaust conditions to stabilize.

The probability that a shift will occur in the immediate future may be determined based on the criteria used to determine when to shift. The probabilities can be determined by any suitable method. In one implementation, the probability is determined based on nearness of the engine speed to a shift point. In another implementation, the probability takes into account one or more of engine speed gradient, engine torque gradient, vehicle speed gradient, pedal position, and pedal position gradient. The relationship between parameters and probability can be incorporated into a formula. In on example, the formula is no more than an extrapolation. In another example, the probabilities can be determined using a probabilistic dependency model using historical data as training examples. The period to which the probability applies can be selected in any suitable manner. Preferably, the period is comparable to the time it takes to initiate and complete a denitration. A suitable period could be three seconds, for example.

When the criteria for denitration is met while denitration is being postponed due to an imminent or probable shift, preparations for denitration can be made during the period of prohibition. For example, in the system 100 the fuel reformer 104 is heated under lean conditions prior to rich regeneration of the lean $NO_x$ trap 105. If the criteria for denitration is met, the fuel reformer 104 can be heated during the period of postponement, whereby denitration can commence quickly once the period of postponement has passed.

In another embodiment, denitration is selectively advanced when a discontinuous shift is imminent or the probability that a shift will occur in the immediate future exceeds a predetermined threshold. In one example, there is sufficient advanced notice of the shift to allow time for the denitration to be essentially completed. A denitration is essentially completed if it is far enough toward completion that it can be completed before a shift will affect exhaust conditions in a way that could negatively impact denitration. The denitration is initiated selectively based on a relaxed denitration criteria being met. A relaxed criteria implies a lowering of the threshold, whereby denitration will generally begin immediately if there is a substantial chance the denitration criteria will be met before the shift is completed and the exhaust condition affected by the shift have substantially stabilized.

The presence of a discontinuous shift, or the imminence or probability of an impending discontinuous shift can be determined by any suitable device. In one embodiment, the determinations are made by a first controller that determines when the transmission will shift and are communicated to a second controller that determines when to denitrate. In another embodiment, however, which may be particularly advantageous when separately developed subsystems are combined into a power generation system, the second controller that determines when to denitrate receives the information required to independently determine the presence, imminence, or probability.

In this later embodiment, the second controller, which determines the timing for denitration, is supplied with all or part of the information used to determine the timing of shifts. In one example, the second controller receives the upshift and downshift points from the first controller and determines presence, imminence, or probability based on arrival, nearness to, and/or rate of approach to the shift points. In another example, the second controller receives all the information and algorithms used by the first controller.

Another potentially convenient approach is to determine the start and/or end of a shift based on information available from an engine control unit (ECU), including vehicle speed and/or engine load (torque). This approach is advantageous for manual transmissions and eliminates the need for access to transmission control information in the case of automatic transmissions. Eliminating the need for access to transmission control information can be advantageous when an aftertreatment system is being added t a pre-existing power generation system.

Observations of speed and or torque information can be used to determine the start and/or end of a shift. The beginning of a shift is characterized by a deceleration combined with an increasing vehicle speed variance. The end of the shift is characterized by an acceleration followed by decreasing vehicle speed variance. Variance for these purposes can be defined in any suitable fashion. Typically, the current speed variance will be calculated from speed data gathered over an immediately preceding period. The variance can then be defined as the sum of the squares of the difference each speed data point and the average of all the data points. The period of time over which the variance is calculated moves forward with time.

In a preferred embodiment, the beginning of a shift is detected based on the vehicle speed variance exceeding an upper threshold during a period when the vehicle is decelerating. The upper threshold for the speed variance can be fixed, but it is preferred that the upper threshold be dynamically determined. In one example, the upper threshold is reset to the current variance whenever there is sustained drop in engine load (a negative gradient over a minimum period) while the vehicle is decelerating. Determining the upper threshold in this way gives faster detection of shifts than using a fixed upper threshold.

The end of the shift is detected when the variance falls below a lower threshold while the vehicle speed and engine load remain positive over a minimum period. Again, the lower threshold can be fixed but it is preferred that the it be dynamically determined for more accurate and faster detection. Following the start of a shift, the lower threshold is set to the current variance after the first occurrence of a minimum period over which the engine load remains positive.

Another of the inventors' concepts is to selectively advance or postpone shift timing in order to avoid discontinuous transmission torque ratio shifts during denitrations. As in the case of varying the denitration timing, the shift timing can be selectively altered to avoid all discontinuous transmission torque ratio shifts during denitration or only some types of discontinuous transmission torque ratio shifts during denitration.

Rather than altering the denitration timing to accommodate the shift, the shift timing can be altered. The shift timing can be selectively advanced when a criteria for initiating denitration is close to being satisfied. Close to being satisfied can be defined in any suitable fashion. Examples include a fixed percentage of the threshold value, e.g. 90%, a fixed offset from the threshold value, or a fixed time until the threshold value is reached based on an estimated rate of change. The shift timing is advanced by initiating the shift before a shift point is reached provided that the engine is close to the shift point and a projection of a rate of change indicate the shift point will be soon reached.

In a more preferred embodiment, the shift is postponed when a denitration is in progress. A signal can be provided to the transmission at the start of regeneration indicating that a denitration is beginning. Shifting can be postponed, for example, for a fixed period or until a signal is received that the denitration is complete. In an alternative embodiment, shifting can be postponed when a denitration is likely to occur within a short period of time, or when a criteria for the start of denitration is close to being satisfied.

Optionally, a first controller determines the time at which to shift and a second controller determines the time at which to denitrate. In such a case, the second controller can send the first controller appropriate signals indicating, for example, that denitration is starting, that a criteria for initiating denitration is close to being satisfied, and/or that a denitration has been completed. Alternative, the criteria for starting and/or ending denitration can be provided to the first controller, which determines the time at which to shift.

Some of the inventors' concepts are applicable to desulfation. It is not practical to avoid shifting during desulfation because desulfation takes too long, however, it is possible to suspend rich periods of desulfation during discontinuous torque ratio shifts or during periods where a discontinuous torque ratio shift is likely. Rich periods of desulfation can resume again once exhaust conditions have stabilized. Suspending desulfation typically involves discontinuing fuel injection in the exhaust line 102, although small fuel injections can be used during this period, if necessary or desirable to maintain the temperature of the fuel reformer 104 and/or the LNT 105.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a power generation system, comprising:
   operating a diesel engine to produce exhaust comprising $NO_X$;
   transmitting power from the diesel engine through a transmission capable of discontinuously shifting between torque ratios;
   passing the exhaust through an exhaust aftertreatment system comprising a lean $NO_X$ trap to adsorb a portion of the $NO_X$ from the exhaust;
   timing denitration of the lean $NO_X$ trap based on a criteria relating to the state and/or the performance of the exhaust aftertreatment system, or a portion thereof comprising the lean $NO_X$ trap; and
   varying the denitration timing to avoid denitrating while the transmission is discontinuously shifting;
   wherein denitrating the lean $NO_X$ trap comprises providing an overall rich exhaust-reductant mixture to the lean $NO_X$ trap, whereby the lean $NO_X$ trap releases and reduces stored $NO_X$.

2. The method of claim 1, wherein:
   the denitration timing is determined by a first controller; and
   the discontinuous shift timing is determined by a second controller, that is physically distinct from the first controller;
   wherein second controller sends the first controller a signal indicating a shift is imminent.

3. The method of claim 2, wherein:
   the signal indicating a shift is imminent is provided sufficiently far in advance of the shift to allow time for a regeneration to be initiated and completed prior to the shift; and
   the first controller selectively initiates a denitration in response to the signal.

4. The method of claim 2, wherein the first controller responds to the signal by preventing the start of any denitration in a period following the signal.

5. The method of claim 2, wherein the first controller responds to the signal by preventing the start of any denitration at least until the first controller receives a further signal from the second controller indicating the shift has been essentially completed.

6. The method of claim 1, wherein:
   the denitration timing is determined by a first controller; and
   the discontinuous shift timing is determined by a second controller, that is physically distinct from the first controller;
   wherein second controller sends the first controller a signal indicating a probability that a shift will occur in an upcoming period.

7. The method of claim 1, wherein:
   the denitration timing is determined by a first controller; and
   the discontinuous shift timing is determined by a second controller, that is physically distinct from the first controller;
   wherein first controller is provided with the criteria used by the second controller in deciding the shift timing.

8. The method of claim 1, wherein:
   the denitration timing is determined by a first controller; and
   the discontinuous shift timing is determined by a second controller, that is physically distinct from the first controller;
   wherein the second controller provides the first controller with upshift and downshift points.

9. The method of claim 1, wherein the denitration timing is varied to avoid some types of shifts, but not to avoid other types of shifts.

10. The method of claim 1, wherein the denitration is postponed to avoid denitrating during shifts.

11. The method of claim 10, wherein the exhaust aftertreatment system further comprises a fuel reformer configured upstream from the lean $NO_X$ trap in an exhaust line and the method further comprises selectively injecting fuel into the exhaust line upstream from the fuel reformer during the shift to heat the fuel reformer in preparation for denitrating the lean NO$_X$ trap.

12. A method of operating a power generation system, comprising:
- operating a diesel engine to produce exhaust comprising NO$_X$;
- transmitting power from the diesel engine through a transmission that discontinuously shifts between torque ratios;
- passing the exhaust through an exhaust aftertreatment system comprising a lean NO$_X$ trap to adsorb a portion of the NO$_X$ from the exhaust;
- timing denitration of the lean NO$_X$ trap based on a criteria relating to the state and/or the performance of the exhaust aftertreatment system, or a portion thereof comprising the lean NO$_X$ trap; and
- varying the timing of the discontinuous shifts to avoid discontinuously shifting while denitrating the lean NO$_X$ trap;
- wherein denitrating the lean NO$_X$ trap comprises providing an overall rich exhaust-reductant mixture to the lean NO$_X$ trap, whereby the lean NO$_X$ trap releases and reduces stored NO$_X$.

13. The method of claim 12, wherein:
- the denitration timing is determined by a first controller; and
- the discontinuous shift timing is determined by a second controller, that is physically distinct from the first controller;
- wherein first controller sends the second controller a signal indicating the criteria for denitration is close to being satisfied.

14. The method of claim 12, wherein:
- the denitration timing is determined by a first controller; and
- the discontinuous shift timing is determined by a second controller, that is physically distinct from the first controller;
- wherein first controller sends the second controller a signal indicating a denitration is imminent.

15. The method of claim 14, wherein:
- the signal indicating a shift is imminent is provided sufficiently far in advance of the denitration to allow time for a shift to be completed prior to the rich phase of the denitration; and
- the second controller selectively initiates a shift in response to the signal.

16. The method of claim 14, wherein the second controller responds to the signal by preventing any discontinuous shift in a period following the signal.

17. The method of claim 14, wherein the second controller responds to the signal by preventing any discontinuous shift at least until the second controller receives a further signal from the first controller indicating the denitration has been essentially completed.

18. The method of claim 12, wherein:
- the denitration timing is determined by a first controller; and
- the discontinuous shift timing is determined by a second controller, that is physically distinct from the first controller;
- wherein first controller sends the second controller a signal indicating a probability that a denitration will occur in an upcoming period.

19. The method of claim 12, wherein:
- the denitration timing is determined by a first controller; and
- the discontinuous shift timing is determined by a second controller, that is physically distinct from the first controller;
- wherein second controller is provided with the criteria used by the first controller in deciding the denitration timing.

20. The method of claim 12, wherein a shift is postponed to avoid shifting during denitration.

* * * * *